United States Patent
Tkachenko et al.

(10) Patent No.: US 12,067,866 B2
(45) Date of Patent: Aug. 20, 2024

(54) METHOD AND DEVICE FOR ANALYZING A SENSOR DATA STREAM AND METHOD FOR GUIDING A VEHICLE

(71) Applicant: AVL LIST GMBH, Graz (AT)

(72) Inventors: Pavlo Tkachenko, Linz (AT); Jinwei Zhou, Linz (AT); Luigi Del Re, Linz (AT)

(73) Assignee: AVL LIST GMBH, Graz (AT)

( * ) Notice: Subject to any disclaimer, the term of this patent is extended or adjusted under 35 U.S.C. 154(b) by 500 days.

(21) Appl. No.: 17/279,186

(22) PCT Filed: Sep. 24, 2019

(86) PCT No.: PCT/AT2019/060315
§ 371 (c)(1),
(2) Date: Mar. 24, 2021

(87) PCT Pub. No.: WO2020/061603
PCT Pub. Date: Apr. 2, 2020

(65) Prior Publication Data
US 2022/0230536 A1  Jul. 21, 2022

(30) Foreign Application Priority Data
Sep. 24, 2018 (AT) .............................. A 50818/2018

(51) Int. Cl.
*G08G 1/01* (2006.01)
(52) U.S. Cl.
CPC ................ *G08G 1/0129* (2013.01)
(58) Field of Classification Search
None
See application file for complete search history.

(56) References Cited

U.S. PATENT DOCUMENTS

2015/0211868 A1  7/2015  Matsushita et al.
2016/0362118 A1*  12/2016  Mollicone ............ G09B 19/167
(Continued)

FOREIGN PATENT DOCUMENTS

CN    105389984 A  *  3/2016
CN    107358678       11/2017
(Continued)

OTHER PUBLICATIONS

Kyaagba "Dynamic Time Warping with Time Series" Sep. 7, 2018; https://medium.com/@shachiakyaagba_41915/dynamic-time-warping-with-time-series-1f5c05fb8950 (Year: 2018).*
(Continued)

*Primary Examiner* — Jaime Figueroa
*Assistant Examiner* — Jerrod Irvin Davis
(74) *Attorney, Agent, or Firm* — Sheridan Ross P.C.

(57) ABSTRACT

The invention relates to a method and to a device for analyzing a sensor data stream, which characterizes a vehicle environment, with respect to a presence of traffic scenarios. The invention further relates to a method for guiding a vehicle. A similarity measure, which indicates the degree of correspondence between a section of the sensor data stream and at least one template stored in a database, is determined by mapping the section of the sensor data stream to the at least one template, preferably by means of dynamic time normalization. The template thereby characterizes a known traffic scenario. The known traffic scenario is assigned to the section of the sensor data stream, if the similarity measure satisfies a predetermined similarity criterion.

17 Claims, 4 Drawing Sheets

(56) References Cited

U.S. PATENT DOCUMENTS

| | | | |
|---|---|---|---|
| 2018/0322394 A1* | 11/2018 | Nguyen | G06N 20/00 |
| 2019/0129432 A1* | 5/2019 | Russell | G06V 20/58 |
| 2020/0001865 A1* | 1/2020 | Stobbe | B60R 21/0132 |

FOREIGN PATENT DOCUMENTS

| | | |
|---|---|---|
| JP | 2019-095878 | 6/2019 |
| KR | 10-2014-0097669 | 8/2014 |
| WO | WO 2017/210222 | 12/2017 |

OTHER PUBLICATIONS

Official Action with machine translation for Austria Patent Application No. A 50818/2018, dated Jul. 6, 2021, 12 pages.

Abdalla et al. "Driver Behavior Classification in Crash and Near-Crash Events Using 100-CAR Naturalistic Data Set," 2017 IEEE Global Communications Conference (GLOBECOM 2017), Dec. 2017, pp. 1-6 DOI: 10.1109/GLOCOM.2017.8253921.

Bose et al. "D&Rsense: Detection of Driving Patterns and Road Anomalies," 2018 3rd International Conference on Internet of Things: Smart Innovation and Usages (IoT-SIU), Feb. 2018, pp. 1-7, DOI: 10:1109/IoT-SIU.2018.8519861.

Camalica et al. "Feature Abstraction for Driver Behaviour Detection with Stacked Sparse Auto-encoders," 2016 IEEE International Conference on Systems, Man, and Cybernetics (SMC 2016), Oct. 9-12, 2016, pp. 003299-003304.

Johnson et al. "Driving Style Recognition Using a Smartphone as a Sensor Platform," 2011 14th International IEEE Conference on Intelligent Transportation Systems, Oct. 5-7, 2011, pp. 1609-1615.

Petitjean et al. "A global averaging method for dynamic time warping, with applications to clustering," Pattern Recognition, 2011, vol. 44, No. 3, pp. 678-693.

Rakthanmanon et al. "Searching and mining trillions of time series subsequences under dynamic time warping," Proceedings of the 18th ACM SIGKDD International Conference on Knowledge Discovery and Data Mining, KDD 12, Aug. 2012, pp. 262-270.

Taherizadeh et al. "Real-time data-intensive telematics functionalities at the extreme edge of the network: Experience with the PrEstoCloud Project," 2018 42nd IEEE International Conference on Computer Software & Applications, Jul. 2018, pp. 522-527.

Tan et al. "Riding Quality Evaluation through Mobile Crowd Sensing," 2016 IEEE International Conference on Pervasive Computing and Communications (PerCom), 2016, pp. 1-6, DOI: 10.1109/PERCOM.2016.7456517.

Official Action with machine translation for Austria Patent Application No. A 50818/2018, dated Jun. 6, 2019, 9 pages.

Translation of the International Search Report for International (PCT) Patent Application No. PCT/AT2019/060315, dated Dec. 16, 2019, 2 pages.

International Search Report and Written Opinion for International (PCT) Patent Application No. PCT/AT2019/060315, dated Dec. 16, 2019, 13 pages.

Official Action with English Translation for Japan Patent Application No. 2021-516562, dated Aug. 21, 2023, 14 pages.

* cited by examiner

METHOD AND DEVICE FOR ANALYZING A SENSOR DATA STREAM AND METHOD FOR GUIDING A VEHICLE

CROSS REFERENCE TO RELATED APPLICATIONS

This application is a national stage application under 35 U.S.C. § 371 and claims the benefit of PCT Application No. PCT/AT2019/060315 having an international filing date of 24 Sep. 2019, which designated the United States, which PCT application claimed the benefit of Austria Patent Application No. A50818/2018 filed 24 Sep. 2018, the disclosures of each of which are incorporated herein by reference in their entireties.

The present invention relates to a method and a device for analyzing a sensor data stream which characterizes a vehicle environment with respect to presence of traffic scenarios as well as a method for guiding a vehicle.

Modern vehicles are increasingly being equipped with advanced driver assistance systems (ADAS) which support the driver in certain driving situations. The support ranges from merely displaying potentially relevant information (e.g. a lane change assistant issuing a warning) to semi-autonomous interventions (e.g. an anti-lock braking system regulating the torque applied to the axles) to fully autonomous interventions in the vehicle control (e.g. an adaptive cruise control (ACC) adaptively regulating velocity).

Usually forming the basis for such driver assistance systems is sensor data such as signals provided by ultrasonic sensors, radar sensors or cameras, on the basis of which the current driving situation can be determined and the function of the respective driver assistance system performed in response. Particularly in the case of driver assistance systems which (autonomously) intervene in the control of the vehicle, the current driving situation must be able to be identified with the highest possible reliability based on the sensor data.

In general, certain rules or respectively criteria associated with a driving situation are thereby established which, if met, enables concluding that a known driving situation exists. Satisfying the rule or respectively criteria thereby acts for example as a trigger for an action of the driver assistance system. For example, in a case in which a neighboring vehicle ahead of the designated ego vehicle equipped with the driver assistance system cuts into the same lane, a traffic scenario can be recognized by a sensor-detected transverse distance perpendicular to the direction of travel to the adjacent vehicle decreasing and ultimately at least substantially reaching the value of 0 when the neighboring vehicle is located directly in front of the ego vehicle.

To test such driver assistance systems, in particular their response in already known traffic scenarios, the driver assistance system to be tested can be fed sensor data which characterizes the already known traffic scenario. In order to reliably test the driver assistance system, a multitude of sensor data, which may potentially also characterize slight variations in the traffic scenario, is normally required.

The automatic generation of simulation scenarios for validating a driver assistance system is known from WO 2017/210222 A1 to that end. A plurality of such simulation scenarios can thereby be generated particularly by the varying of recorded scenarios, wherein the variations are based on a data stream generated by isolating differences between similar recorded scenarios.

It is a task of the present invention to further improve the analysis of a sensor data stream with respect to the presence of traffic scenarios, particularly to recognize existing traffic scenarios more reliably and/or readily by analyzing the sensor data stream.

This task is solved by a method and a device for analyzing a sensor data stream which characterizes a vehicle environment with respect to presence of traffic scenarios as well as by a method for operating a driver assistance system in accordance with the independent claims.

A first aspect of the invention relates to a method for analyzing a sensor data stream characterizing a vehicle environment with respect to presence of traffic scenarios which comprises the following procedural steps: (i) ascertaining a measure of similarity which indicates the degree of correspondence between a section of the sensor data stream and at least one template stored in a database by mapping the section of the sensor data stream onto the at least one template, preferably by means of dynamic time warping, wherein the template characterizes a known traffic scenario; and (ii) assigning the known traffic scenario to the section of the sensor data stream when the measure of similarity satisfies a predefined similarity criterion.

In particular, the method is implemented as a computer-assisted method.

A sensor data stream within the meaning of the invention is, in particular, a chronological sequence of sensor data, particularly of corresponding signals, which characterize a vehicle environment at one respective point in time. In other words, a sensor data stream can furnish information relative to the vehicle surroundings, in particular continuously. A sensor data stream can be provided or respectively generated by for example a sensor device which preferably comprises one or more, possibly different, sensors for detecting the vehicle surroundings. Alternatively, however, a sensor data stream can also be artificially generated, for example via a simulation. Preferably, the sensor data stream is composed of pre-processed, in particular prepared, e.g. merged, sensor data and contains for example information regarding the relative distances between road users or other objects, particularly taking road curvatures into account.

A section of a sensor data stream within the meaning of the invention is in particular a temporal section of the sensor data stream. A sensor data stream section can for example be an excerpt from the sensor data stream. In other words, a sensor data stream section can contain sensor data that has been or is to be provided in a potentially predefined time frame. A section can in particular contain a series of values, in particular a time-series of values.

A template within the meaning of the invention is in particular a series of values and can in particular contain a time-series of values. In particular, a template can map a driving maneuver of at least one vehicle. Preferably, a template is a particularly generic section of a sensor data stream characteristic of a specific, in particular known, traffic scenario.

Within the meaning of the invention, assigning a sensor data stream section to a known traffic scenario is in particular a classification (label) of in particular the section of the sensor data stream. Preferably, the sensor data stream section is accordingly identified during the assignment, e.g. by setting a marker or a value respectively characteristic in each case of the known traffic scenario.

Within the meaning of the invention, mapping a sensor data stream section onto a template is in particular an adaptation, in particular a transforming, of the section and/or the template such that the section, in particular a time curve of the section, corresponds at least substantially, in particular as closely as possibly, to the template, in particular to a time curve of the template. For example, the section and/or the template can be compressed and/or stretched during mapping such that e.g. a shape of the time-series of values contained in the section at least substantially corresponds to a shape of the time-series of values contained in the template.

A dynamic time warping (DTW) within the meaning of the invention is in particular a method, in particular an algorithm, for mapping sets of values, e.g. time-series, such as a section of a sensor data stream of possibly different lengths onto one another. A matrix is thereby preferably generated which contains a distance between individual elements of the series of values as matrix elements, e.g. a Euclidean distance, a Manhattan distance or a Mahalanobis distance. On the basis of a cost function into which these distances are entered, the minimum costs for the various assignments of the individual elements of the sets of values mapped by the distances can then be ascertained in order to find the most precise mapping of the series of values to one another.

A measure of similarity within the meaning of the invention is in particular a value which characterizes the similarity between two sets of values, e.g. time-series, such as a section of a sensor data stream. Preferably, the measure of similarity is based on a distance, e.g. a Euclidean distance, a Manhattan distance or a Mahalanobis distance. The measure of similarity can thereby be proportional, in particular equal, to the distance. Alternatively, the measure of similarity can however also be inverse to the distance. Preferably, the similarity measure thereby corresponds to a distance ascertained by an optimization function. In other words, the measure of similarity can characterize a distance, potentially abstract distance, between a sensor data stream section and a template.

A traffic scenario within the meaning of the invention is preferably a chronological development of elements of scenes within a sequence of scenes beginning with a start scene. In contrast to scenes, scenarios cover a specific span of time.

A scene preferably describes a snapshot of the surroundings which in particular includes all spatially stationary elements and dynamic elements.

The invention is based in particular on the approach of comparing a section extracted from a stream of sensor data, provided for example by a sensor device detecting a vehicle environment or by a simulator, to a template characterizing a known traffic scenario, for example a spatial constellation of road users and/or their dynamic development, in particular at least one driving maneuver. A classification of the data stream section can then be effected as a function of a result of the comparison. For example, the section can classified as being associated with the known traffic scenario characterized by the template.

Based on the resulting classification, information relating to the known traffic scenario can be output or provided respectively, for instance transmitted to a driver assistance system via an interface.

The sensor data stream section is thereby preferably compared to the template by a dynamic time warping of the section and the template; i.e. by mapping the section onto the template. A measure of similarity thereby established, in particular a distance between the section and the template, can provide an indication of how well the section and the template match, e.g. how much a vehicle environment characterized by the sensor data stream section differs from the known traffic scenario. If the measure of similarity satisfies a similarity criterion; i.e. the differences between the section and the template are not too major, the known traffic scenario characterized by the template is assigned to the sensor data stream section. In other words, an unknown traffic scenario characterized by the sensor data stream section is in this case identified with the known traffic scenario.

Using dynamic time minimization thereby enables particularly quick and reliable identifying of the unknown traffic scenario characterized by the sensor data stream, in particular the section. It is particularly not necessary to derive multiple parameters from the sensor data stream in a potentially complex manner and to check whether these meet various criteria. Instead, the invention enables, based on dynamic time warping, using an algorithm, preferably an algorithm which saves computing time, for instance the algorithm specified by Rakthanmanon et. at. in "Searching and mining trillions of time series subsequences under dynamic time warping," Proceedings of the 18th ACM SIGKDD International Conference on Knowledge Discovery and Data Mining, KDD 12, 262-270 (2018), to determine only one parameter, in particular the similarity measure, and use it for the reliable identification of the traffic scenario.

Using dynamic time warping in particular also enables reliably assigning the known traffic scenario of a section of the sensor data stream characterizing a variation of the traffic scenario, particularly by mapping onto a generic template for the known traffic scenario. This can thereby prevent the sensor data stream section from being classified differently in each case, thereby enabling the sensor data stream to be efficiently processed.

Overall, the invention enables further improving the analysis of a sensor data stream as regards the presence of traffic scenarios, in particular the more reliable and/or easier recognition of existing traffic scenarios by analysis of the sensor data stream.

Preferential embodiments of the invention and their further developments are described in the following which, unless expressly excluded, can be combined with one another as desired as well as with the aspects of the invention described below.

In one preferential embodiment, the section of the sensor data stream is stored in the database upon being assigned to the known traffic scenario. Preferably, the section is accordingly classified; i.e. identified as being associated with the known traffic scenario. The section can in particular be assigned to a cluster of sections having been assigned to the known traffic scenario already stored in the database or form part of such a cluster respectively. The section of the sensor data stream thereby stored as such can be taken into account in a future (further) processing of the data stored in the database, e.g. a future adaptation of the at least one template.

In a further preferential embodiment, the method further comprises the following procedural step: saving the sensor data stream section in the database as a further template if the measure of similarity does not satisfy the predefined similarity criterion. Preferably, the further template can subsequently be used in order to be able to assign further, in particular future, sections of the sensor data stream to the in particular previously unknown traffic scenario characterized by the further template. The database can in this way be expanded. In particular, new traffic scenarios, e.g. new driving maneuvers, can be added to the database. In other words, new traffic scenarios can thereby be learned and a corresponding dynamic expansion of the database realized.

This case can for example ensue when a rare traffic scenario occurs, for instance a vehicle performing an unusual maneuver which is not or has not yet been recorded by a template in the database. The section of the sensor data stream and this rare and previously unknown traffic scenario which does not correspond to any of multiple templates stored in the database, at least within the framework specified by the similarity criterion; i.e. particularly not precisely enough via the dynamic time warping, can then in particular be characterized, mapped onto one of the templates, stored in the database as a new template, and thus form for instance a new traffic scenario class.

In a further preferential embodiment, the method further comprises the following procedural step: (i) checking whether at least one template is stored in the database; and (ii) adding the sensor data stream section to the database as a template as a function of the test result. In particular, the sensor data stream section is stored in the database if no template has yet to date been saved in the database. The database can in this way be advantageously initialized or assembled respectively. In particular, a potentially complex preparation or respectively population of the database can thereby be dispensed with. In a further preferential embodiment, the method further comprises the following procedural step: adapting the template when the similarity measure simultaneously satisfies the predefined similarity criterion and a predefined adaptation criterion. For example, the template can be adapted when the section of the sensor data stream is assigned to the known traffic scenario characterized by the template but yet there are certain differences between the section and the template. As a result, further, in particular future, sections of the sensor data stream can be assigned to the correct traffic scenario in a particularly reliable manner.

For example, the template can be adapted, particularly by recalculation, when, based on a distance between the sensor data stream section and the template ascertained by the dynamic time warping, the section can be assigned to a cluster of sections corresponding to the known traffic scenario albeit not near the cluster's barycenter.

In a further preferential embodiment, all the sections of the sensor data stream assigned to the known traffic scenario, in particular previously stored in the database, are averaged by dynamic time warping when adapting the template. Preferably, the averaging is thereby realized with the dynamic time warping barycenter averaging method as known for example from Petitjean et. al. in "A global averaging method for dynamic time warping, with applications to clustering," Pattern recognition, 44(3), 678-693 (2011). Iterative pairwise averaging can thereby be avoided, which advantageously reduces computing time. In addition, averaging can use any desired sequence of the sensor data contained in the stored sections of the sensor data stream and the in particular temporal length of the thus adapted template is advantageously not increased.

Preferably, the method thus forms a real-time version of so-called k-means clustering, wherein the templates stored in the database form barycenters of different clusters, each corresponding to a known traffic scenario. A new member, i.e. a further section of the sensor data stream, can thereby be added to a cluster when the similarity criterion is met. If, however, the adaptation criterion is also satisfied at the same time, e.g. the mapping of the section of the sensor data stream on the template does not achieve a predefined quality, the barycenter of the corresponding cluster, i.e. the template, is adapted, in particular recalculated, particularly by averaging all the members of the cluster. Should the similarity criterion already not be satisfied; i.e. the sensor data stream section not being able to be constructively mapped onto one of the templates, particularly through dynamic time warping, the section forms a new cluster. By the method being designed as a k-means algorithm, sections of the sensor data stream can be assigned to the correct traffic scenario in particularly reliable manner, in particular with a high degree of probability, or the database dynamically adapted and/or expanded respectively.

In a further preferential embodiment, the predefined similarity criterion is or will be satisfied when the measure of similarity falls below a predefined similarity threshold value. Preferably, a check is thereby made as to whether a distance between the sensor data stream section and the template ascertained by dynamic time warping is smaller than the predefined similarity threshold value. As a result, a reliable and unambiguous decision can be made, particularly while saving computing power, as to whether the section of the sensor data stream should be assigned to the known traffic scenario characterized by the template.

In a further preferential embodiment, the predefined adaptation criterion is or will be satisfied when the measure of similarity exceeds an adaptation threshold value which is dependent on the similarity criterion, particularly the similarity threshold value. As a result, a reliable and unambiguous decision can be made, particularly while saving computing power, as to whether the template characterizing the known traffic scenario should be adapted, for example recalculated.

Preferably thereby checked is whether a distance between the sensor data stream section and the template ascertained by dynamic time warping is greater than the predefined adaptation threshold value. The template can thus then be adapted particularly when the degree of correspondence between the section of the sensor data stream and the template is not too high. In other words, the template is preferably only adapted when the section of the sensor data stream currently mapped onto the template deviates at least to a certain extent from the template and an adaptation of the template is thus also appropriate. In particular, unnecessary adaptation of the templates can thus be avoided.

Preferably, the dependency of the adaptation criterion, in particular the adaptation threshold value, is characterized by an in particular mathematical function. For example, the value of this function can indicate the adaptation criterion, in particular the adaptation threshold value, when at least the similarity criterion, in particular the similarity threshold value, is selected as the input variable of the function. The function can thereby be configured to weight the similarity criterion, in particular the similarity threshold value, for example by multiplying by a factor of less than one. In other words, the adaptation criterion can correspond to a weighting of the similarity criterion.

In a further preferential embodiment, the method further comprises the following procedural step: predefining the similarity criterion, in particular the similarity threshold value, on the basis of a comparison of multiple, in particular all, the similarity measures ascertained in the mapping, in particular by dynamic time warping, of at least the sections of the sensor data stream assigned to the known scenario, in particular stored in the database, to one another. Preferably, a similarity measure characterizing the lowest degree of correspondence between the sensor data stream section and the template is used in the comparison, e.g. a maximum distance between the sensor data stream section and the template ascertained by the dynamic time warping and the similarity criterion, in particular the similarity threshold value, formed therefrom. As a result, the similarity criterion, in particular the similarity threshold value, can be dynamically adapted, for example to the quality of the sensor data contained in the sensor data stream.

For example, all the respective members of a cluster corresponding to a known traffic scenario, the barycenter of which is formed by the corresponding template, can be mapped onto the template by dynamic time warping. The maximum distance is selected, e.g. filtered out, from the distances thereby ascertained between the members; i.e. sections of the sensor data stream and the template, and used as a similarity criterion, particularly a similarity threshold value.

In a further preferential embodiment, a plurality of similarity measures are ascertained by mapping the section of the sensor data stream onto a respective one of a plurality of templates stored in the database, each of which characterizes a different known traffic scenario, and the sensor data stream section is assigned to the known traffic scenario based on a comparison of the multiple ascertained similarity measures to one another. In other words, an unknown traffic scenario characterized by the section of the sensor data stream is compared to a plurality of already known traffic scenarios and preferably identified on the basis of this comparison.

Preferably, when comparing a similarity measure characterizing the highest degree of correspondence between the sensor data stream section and a template, e.g. the sensor data stream section of minimum distance between the sensor data stream section and the template ascertained by dynamic time warping, is ascertained and the section assigned to the known traffic scenario characterized by the corresponding template. The traffic scenario currently characterized, in particular mapped, by the section of the sensor data stream can thereby be identified reliably and quickly.

In a further preferential embodiment, the sensor data stream characterizes at least one distance, in particular transversal distance, i.e. perpendicular to the direction of travel, between two road users in the traffic scenario. For example, when two vehicles are driving side by side in two adjacent lanes, the distance between the vehicles does not change. When one of the vehicles executes a driving maneuver, e.g. by accelerating or passing respectively or switching into the other lane, the distance between the vehicles changes. This change can be characteristic of the driving maneuver or traffic scenario respectively. The, in particular temporal, curve of the distance during this driving maneuver can thus form a template for the traffic scenario stored in the database. A section of the sensor data stream can thereby be assigned to the correct traffic scenario with a high degree of probability.

In a further preferential embodiment, the sensor data stream is provided by a sensor device of a vehicle while the vehicle is in operation.

The sensor device preferably comprises a plurality of sensors, for example at least one camera, at least one radar sensor, at least one lidar sensor, at least one ultrasonic sensor and/or the like which generate corresponding sensor data, preferably at least substantially continuously, wherein the sensor data stream is preferably formed by merging the sensor data. Based on the assignment of the sensor data stream section to the known traffic scenario, information relating to the thus identified traffic scenario can be output in situ; i.e. essentially in real time, and provided to for example a driver assistance system. Filling the database with templates is also possible, e.g. within the scope of test drives, so that the database or the data contained therein respectively can be drawn on at a later point in time to identify traffic scenarios. By providing the sensor data stream while the vehicle is in operation, the database can also be expanded in situ, i.e. in real time.

In a further preferential embodiment, the method further comprises the following procedural step: selecting the section from the sensor data stream, wherein a start of the sensor data stream section and/or an end of the sensor data stream section is/are selected such that the start of the sensor data stream section and the end of the sensor data stream section are separated from one another by a predefined period of time. Preferably, the thusly selected section of the sensor data stream forms a time frame, within which is factored in sensor data contained in the sensor data stream, for instance sensor data provided by a sensor device of a vehicle or a simulation, e.g. when identifying an existing traffic scenario. Predefining the time period; i.e. selecting the length of the time frame, thereby enables achieving a particularly reliable assignment of the sensor data stream section to the known traffic scenario.

Preferably, the end of the section is formed by sensor data currently generated by the sensor device or the simulation. This thereby enables for example a reliable identification of the currently prevailing traffic situation.

In a further preferential embodiment, at least the selecting of the sensor data stream section, the ascertaining of the measure of similarity and the assigning of the sensor data stream section are performed repeatedly. Preferably, when repeatedly selecting the section of the sensor data stream, the start and/or end of the sensor data stream section is/are thereby selected such that the sensor data stream section overlaps a previously selected sensor data stream section by no more than halfway. In other words, a further section of the sensor data stream is not mapped onto at least one template until half of the predefined period of time has elapsed. Thereby able to be ensured is that two sections of the sensor data stream mapped successively onto a plurality of templates will sufficiently differ from one another so as to be able to be assigned to different known traffic scenarios.

A second aspect of the invention relates to a device for analyzing a sensor data stream which characterizes a vehicle environment with respect to presence of traffic scenarios. The device preferably comprises a processing module configured to ascertain a measure of similarity indicating the degree of correspondence between a section of the sensor data stream and at least one template stored in a database by mapping the section of the sensor data stream onto the at least one template, preferably by means of dynamic time warping, wherein the template characterizes a known traffic scenario. In addition, the device preferably comprises an assignment module configured to assign the known traffic scenario to the sensor data stream section when the measure of similarity meets a predefined similarity criterion.

Preferably, the device also comprises a sensor device configured to detect an environment of the vehicle and provide the sensor data stream. The sensor device can comprise one or more sensors, e.g. cameras, ultrasonic sensors, radar sensors, lidar sensors and/or the like, in order to be able to reliably detect, preferably redundantly, variables relevant to characterizing a present traffic scenario such as for instance distances between road users.

The device preferably also comprises a database configured to store at least one and preferably a plurality of templates, each characterizing a known traffic scenario.

A third aspect of the invention relates to a method for guiding a vehicle on the basis of a sensor data stream via a driver assistance system, wherein the sensor data stream is analyzed by means of the method according to the first aspect of the invention. Preferably, an output signal which characterizes the known traffic scenario, or the traffic scenario identified on the basis of the sensor data stream section respectively, in particular a known maneuver, is thereby generated on the basis of the assignment of the sensor data stream section preferably characterizing a current traffic scenario to the known traffic scenario characterized by the template stored in the database and provided to the driver assistance system. The driver assistance system can thus react reliably to the present traffic scenario.

The features and advantages described with respect to the first aspect of the invention and advantageous embodiment thereof also apply, at least where technically reasonable, to the second aspect of the invention and advantageous embodiment thereof and vice versa.

Further features, advantages and possible applications of the invention will become apparent from the following description in conjunction with the figures, in which the same reference numerals are used throughout for the same or corresponding elements of the invention. Shown therein at least partially schematically.

Figure 1:
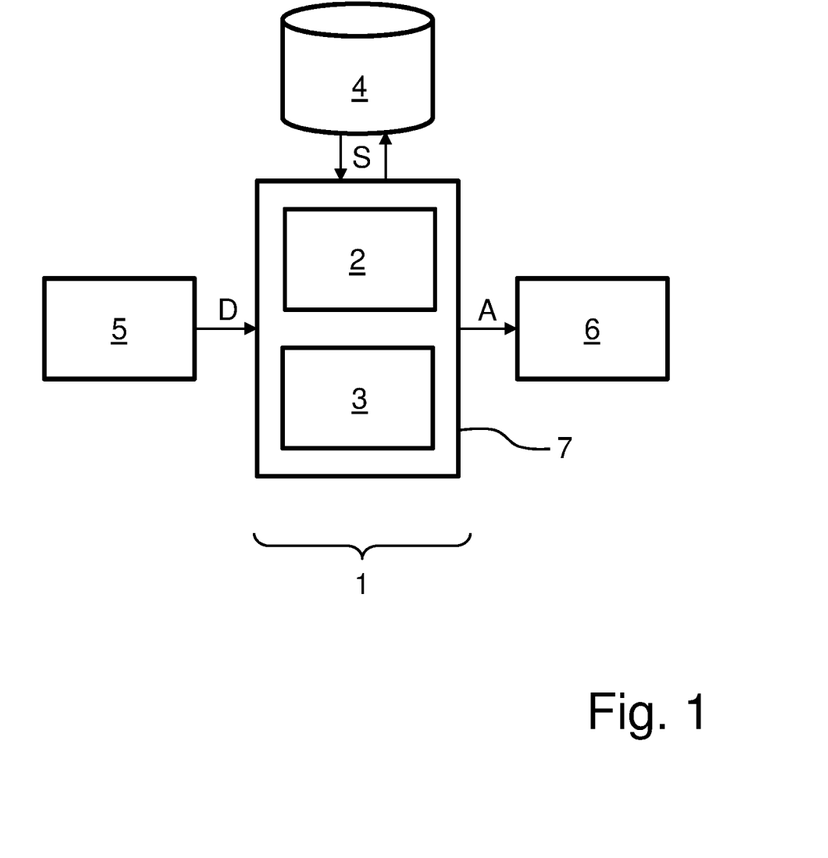
FIG. 1 a preferred embodiment of a device according to the invention.

FIG. 1 shows a preferred embodiment of an inventive device 1 for analyzing a sensor data stream D characterizing a vehicle environment, comprising a processing module 2, an assignment module 3 and a database 4. The device 1 is preferably connected to a sensor device 5 configured to detect a vehicle environment and provide a corresponding sensor data stream D and to a driver assistance system 6. The driver assistance system 6 can for example be controlled on the basis of an output signal A generated by the device 1 based on the analysis of the sensor data stream.

It is also alternatively conceivable for the sensor device 5 and/or the driver assistance system 6 to be a part of the device 1.

The processing module 2 and/or the assignment module 3 is/are preferably realized in the form of software, e.g. as program code, and able to be executed by means of a data processing unit 7.

The processing module 2 is preferably configured to ascertain a measure of similarity which characterizes the degree of correspondence between a section of the sensor data stream D and at least one template S stored in the database 4. The processing module 2 can thereby provide the section of the sensor data stream D, for instance by extracting the sensor data contained in the sensor data stream D over a predefined time frame, and map it on the at least one template S, for example by applying a dynamic time warping (DTW) method. The similarity measure is preferably obtained as a result of this mapping.

The processing module 2 can in particular be configured to dynamically warp the section extracted from the sensor data stream S; i.e. in particular non-linearly, for example compress and/or stretch at least sections thereof. As a result, the sensor data contained in the section can for example be accordingly assigned to the template data corresponding to the template. Preferably, the processing module 2 determines the assignment on the basis of an optimization function, in particular such that the section of the sensor data stream D is mapped onto the template S particularly precisely; i.e. with minimal deviations. A remaining distance, in particular in the form of a difference between the section of the sensor data stream D and the template S, preferably forms the measure of similarity.

The distance can in particular characterize the differences between the sensor data contained in the section and the template data assigned thereto in each case. For example, particularly the differences between the sensor data and template data can be ascertained and summed for a respective pair of sensor data and template data in order to obtain the distance.

Preferentially, each of the templates S stored in the database 4 characterize a known traffic scenario. The template data corresponding to a template can correspond for example to values of a parameter which at least partially characterize the traffic scenario, particularly the time curve. Such a parameter can for instance be the distance between two road users.

The assignment module 3 can be accordingly configured to assign a known traffic scenario to the section of the sensor data stream D on the basis of the templates S stored in the database 4 and the similarity measure ascertained by the processing module 2, particularly when the similarity measure satisfies a predefined similarity criterion, e.g. is below a predefined similarity threshold value.

In other words, the assignment module 3 is preferably configured to check whether the ascertained similarity measure meets the predefined similarity criterion. For example, the processing module 2 can ascertain whether the distance between the section of the sensor data stream D and the template S obtained during the dynamic time warping of the section of the sensor data stream D falls below a predefined similarity threshold; i.e. whether the section and the template S are so similar to each other that the distance ascertained between them is below the similarity threshold value.

Depending on a result of the test, in particular when the measure of similarity meets the predefined similarity criterion, or the distance falls below the predefined similarity threshold respectively, the assignment module 3 can assign the section of the sensor data stream D to a known traffic scenario characterized by the template S. The output signal A is preferably generated by the assignment module 3, preferentially likewise as a function of the result of the test, and characterizes the known traffic scenario. The output signal A can for example contain information relative to the known traffic scenario.

Should the section of the sensor data stream D not be able to be constructively mapped onto any of the templates 5, i.e. when the similarity measure does not meet the predefined similarity criterion, the database 4 can be expanded by a further template S characterized, in particular formed, by the currently considered section of the sensor data stream D. In particular, the section can in this case be stored in the database 4 as a further template S.

Figure 2:
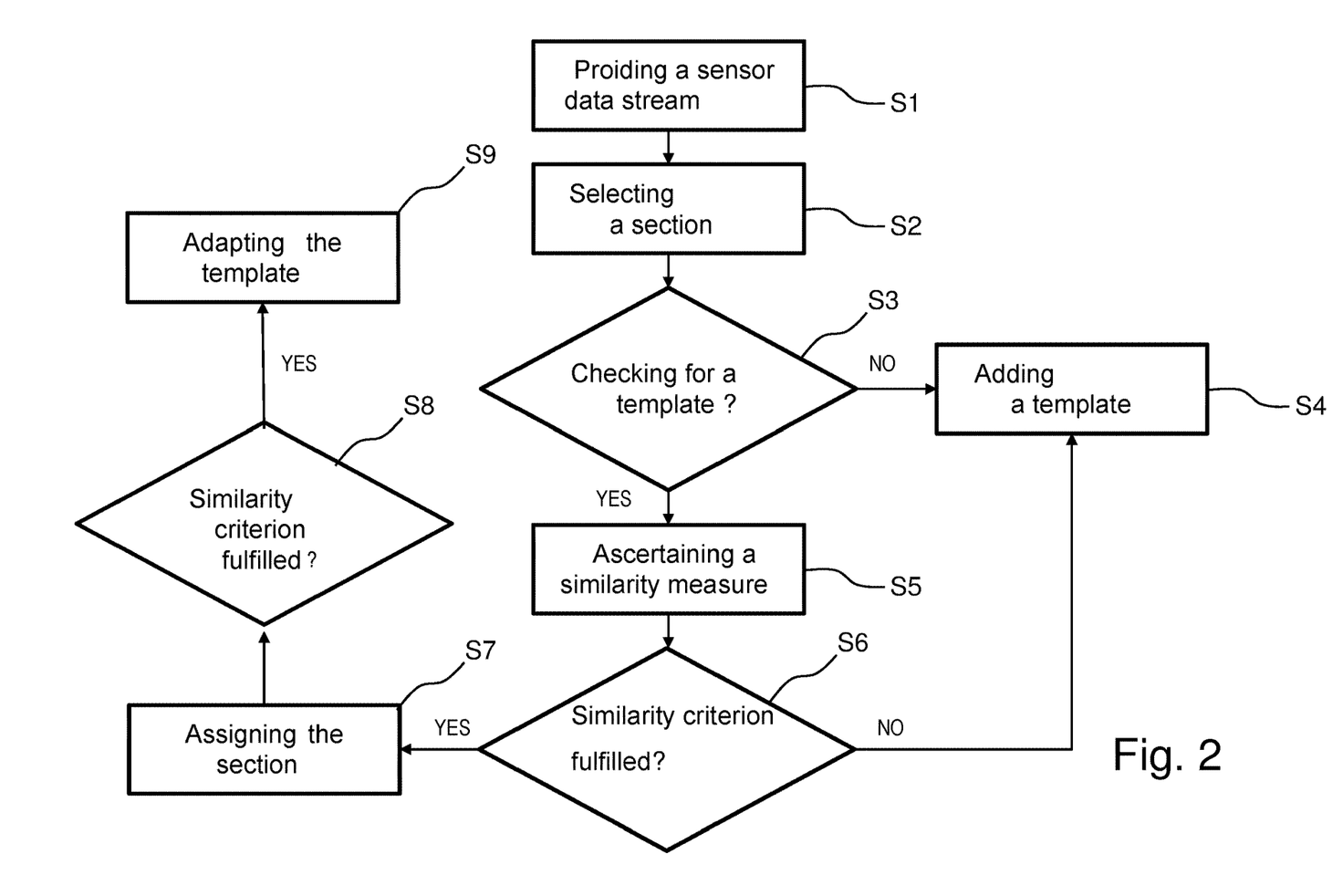
FIG. 2 a preferred embodiment of a method according to the invention.

FIG. 2 shows a preferred exemplary embodiment of an inventive method 100 for analyzing a sensor data stream which characterizes a vehicle environment with respect to the presence of traffic scenarios.

The sensor data stream is provided in method step S1, for instance by a sensor device detecting a vehicle environment or by simulation. The sensor data stream is preferentially formed from a time series of sensor data, wherein the sensor data can contain values of a parameter which characterize a traffic scenario. For example, the sensor data stream can illustrate the time curve of distances between road users.

A section is selected from the sensor data stream in a further method step S2, for example by the sensor data being extracted from the sensor data stream within a predefined time frame. In particular, a start of the section and/or an end of the section can be selected, wherein the start and the end of the section are preferably separated from one another by a predefined period of time. The end of the section is thereby preferentially formed by the most recently provided sensor data from the sensor data stream.

In a further method step S3, a check is made as to whether at least one template which characterizes a known traffic scenario is stored in a database. Should there be no such template in the database, the sensor data stream section can be stored in the database as a template in a further method step S4. Otherwise, the sensor data stream section can be mapped onto the at least one template stored in the database in a further method step S5, wherein a measure of similarity is preferably ascertained. The similarity measure thereby preferentially characterizes a degree of correspondence between the sensor data stream section and the template.

The section can thereby be mapped onto the template on the basis of dynamic time warping, wherein the similarity measure is preferentially formed by a distance between the section and the template obtained by the dynamic time warping. The distance can be a measure of the difference between the section mapped on the template and the template, in particular between sensor data contained in the section and template data contained in the template. The distance or the similarity measure respectively is thus preferably small when the section and the template are very similar to each other or, respectively, large when the section and the template are dissimilar.

If a plurality of templates are already stored in the database, the section is preferably mapped onto each of the templates and a measure of similarity thusly ascertained in each case.

In a further method step S6, a check is made as to whether the similarity measure or respectively measures ascertained in method step S5 meets/meets a predefined similarity criterion, for example whether the distance obtained by means of the dynamic time warping is smaller than a predefined similarity threshold.

If this is not the case for any of the templates, the section of the sensor data stream can be stored in the database as a further template in method step S4, particularly in addition to templates already stored in the database. The sensor data stream section thus maps a further, to date previously unknown, traffic scenario in the database.

On the other hand, if at least one similarity measure meets the similarity criterion, for example the distance obtained by means of the dynamic time warping is below the predefined similarity threshold, a known traffic scenario can preferentially be assigned to the sensor data stream section in a further method step S7.

If there is a plurality of similarity measures as ascertained in method step S5, they are preferably compared to each other and the section assigned a known traffic scenario on the basis of a result of the comparison. For example, that similarity measure which characterizes the highest degree of correspondence between the section and the template corresponding to the similarity measure can be ascertained from the comparison. In particular, the smallest of the distances obtained in the dynamic time warping can be selected and the traffic scenario characterized by the thereby corresponding template can be assigned to the section.

In addition, a check can be made in a further method step S8 as to whether the similarity measure possibly selected from a plurality of similarity measure ascertained in method step S5 as described above also satisfies, in addition to the similarity criterion, a predefined adaptation criterion, for example whether the distance obtained in the dynamic time warping is greater than an adjustment threshold value.

If this is the case, the template corresponding to the similarity measure can be adapted in consideration of the sensor data stream section in a further method step S9. For example, the template can be corrected by averaging multiple sections of the sensor data stream to which the corresponding known traffic scenario had been assigned in method step S7.

Figure 3:
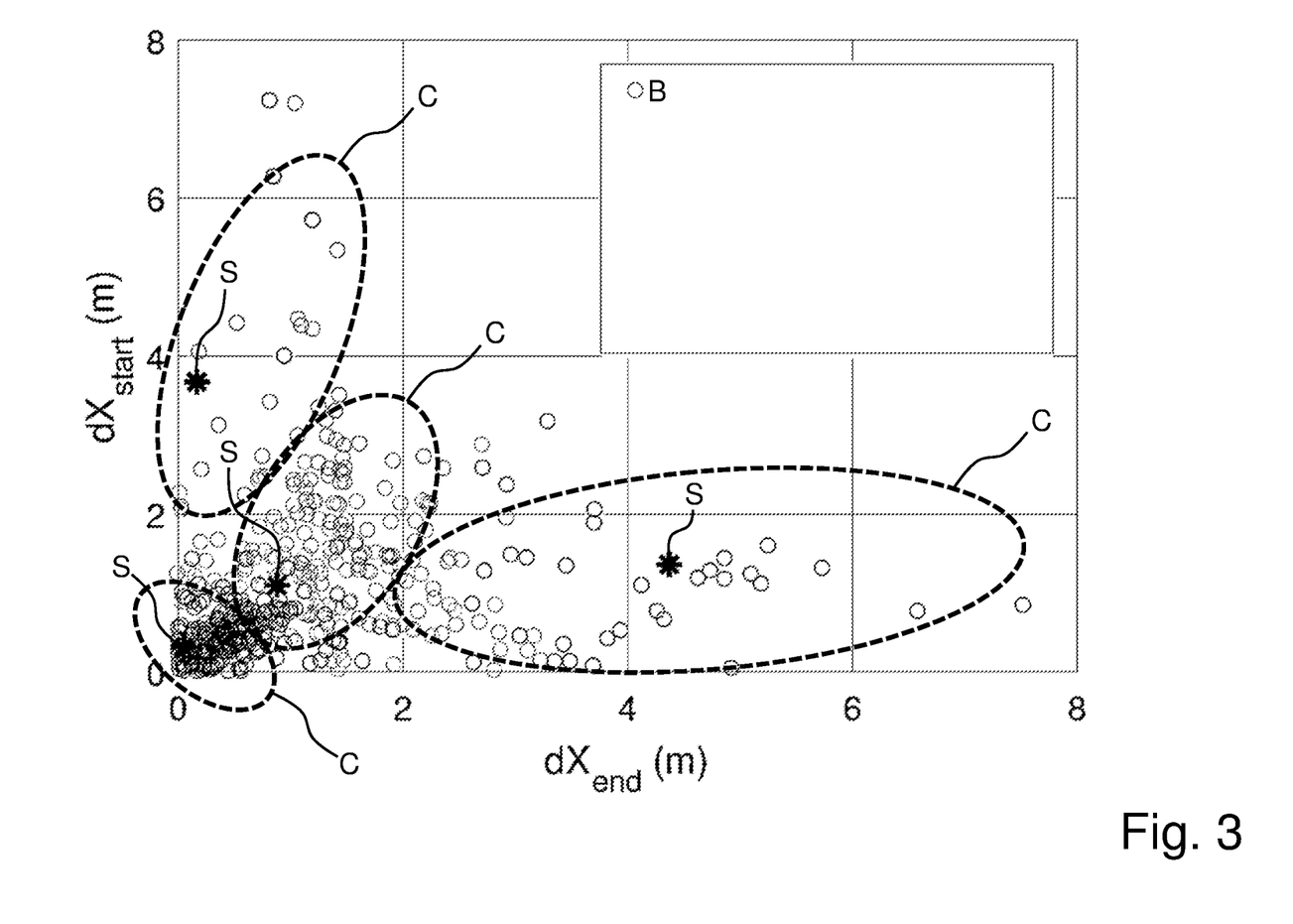
FIG. 3 a display illustrating an assignment of a known traffic scenario characterized by a template to a section of a sensor data stream.

FIG. 3 shows a display illustrating an assignment of a known traffic scenario characterized by a template S to a section B of a sensor data stream. The traffic scenario is for example a merge-in maneuver, a merge-out maneuver, driving one behind the other in one lane, or driving between two lanes. Different sections B thereby correspond e.g. to different driving maneuvers and, within these driving maneuvers, also to different executions and/or variations of the respective driving maneuver.

Figure 4:
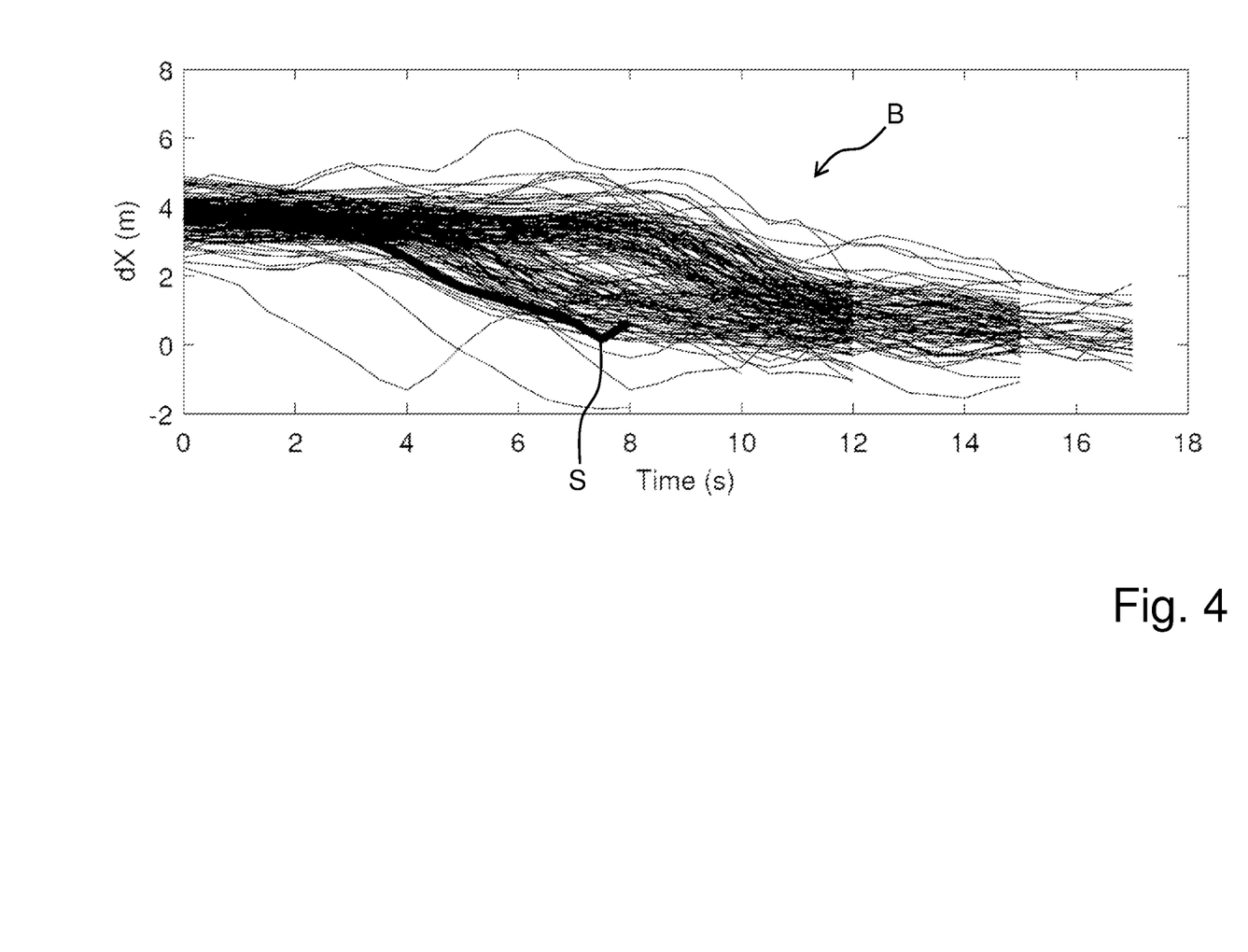
FIG. 4 a display illustrating an adaptation of a template.

For each of the sections, the position of the sections B of the sensor data stream shown in the display in FIG. 3 thereby depends on a transversal start distance $dX_{start}$, i.e. the component of the distance between two vehicles perpendicular to the direction of travel at the beginning of the driving maneuver, and a transversal end distance $dX_{end}$, i.e. the component of the distance between two vehicles perpendicular to the direction of travel at the end of the driving maneuver. For a better understanding, FIG. 4 shows sections B, which correspond to a merge-in maneuver in which two vehicles are initially driving in two adjacent lanes and one of the vehicles merges in front of the other vehicle. In this context, it can for example be seen from FIG. 4 that the transversal start distances $dX_{start}$ at the beginning of the driving maneuver, when the vehicles are still driving in adjacent lanes, is essentially in the range of 4 m and the transversal end distances $dX_{end}$ a the end of the driving maneuver, when the vehicles are driving in the same lane, is essentially in the range of 0 m.

Since there are slightly different start and end distances $dX_{start}$, $dX_{end}$ for every possible maneuver, and thereby also for every possible execution of the maneuver; i.e. for each of sections B, the position of the sections B in the FIG. 3 display allows easily distinguishing among the various driving maneuvers and/or possible executions of the maneuvers.

As indicated in FIG. 3, the sections B in the selected display form cluster C, wherein the templates S in the depicted example in each case form the barycenter of a cluster C of multiple sections B of the sensor data stream. A cluster C thereby preferably includes all those sections B of the sensor data stream having time curves (e.g. as shown FIG. 4) which exhibit a certain similarity to one another. In the display depicted in FIG. 3, this similarity is illustrated by the spatial position; i.e. the similar start and end distances $dX_{start}$, $dX_{end}$ of the sections B, whereby similar sections B of the sensor data stream respectively are spatially proximate each other within a region. For example, all the sections B which correspond to different executions of the merge-in maneuver are in a range of $dX_{start} \approx 4$ and $dX_{end} \approx 0$, whereas all the sections B resulting from different executions of a follow-up maneuver with one vehicle in the same lane as another are in a range of $dX_{start} \approx 0$ and $dX_{end} \approx 0$.

A cluster C is thereby preferably assigned all those sections B of the sensor data stream for which an ascertained similarity measure characterizing the degree of correspondence between the respective section B and the template S of the cluster C satisfies a similarity criterion. The similarity measure is thereby preferably ascertained by mapping the respective section B onto the respective template S via dynamic time warping.

The section B is thereby preferably dynamically compressed and/or stretched; i.e. at least in sections, by the dynamic time warping during the mapping onto the respective template S such that it at least substantially corresponds to the template S or follows its gradient respectively. For example, the time curve of a parameter such as the transversal distance between two vehicles which at least partially characterizes the still unknown traffic scenario to be identified and mapped by section B of the sensor data stream is adapted by the dynamic time warping to the time curve of said parameter as mapped by the template S and characteristic of the known traffic scenario. The similarity measure thereby preferably indicates the deviations between the time profile mapped by way of section B and the time profile mapped by way of template S (reference is made to FIG. 4 for examples of the time curve of sections B).

Should the measure of similarity thusly ascertained satisfy a predefined similarity criterion, one of the templates S or one of the clusters C respectively, and thus one of the known traffic scenarios, can be assigned to the further section B. The known traffic scenario with the template S exhibiting the highest ascertained degree of correspondence to section B is thereby preferably assigned to the further section B.

The similarity measure which indicates the degree of correspondence can thus correspond for example to a distance between section B of the sensor data stream and the respective template S ascertained within the scope of dynamic time warping.

A satisfying of the similarity criterion can thus for example include: the distance falling below a similarity threshold value. Alternatively or additionally, the satisfying of the similarity criterion can include: the ascertained distance being less than all other distances ascertained with respect to the other templates S. In other words, a section B is preferably assigned to a cluster C or to the driving maneuver and/or traffic scenario corresponding thereto respectively when the distance of section B to the template S corresponding to cluster C is sufficiently small enough and in particular less than the distances of section B to all other templates S.

Whether the similarity measure satisfies a predefined adaptation criterion can also be checked. If this is the case, the corresponding template S, which characterizes the known traffic scenario assigned to section B, is preferentially adapted. This is also described further below in conjunction with FIG. 4.

Preferably, the adaptation criterion is satisfied when the distance between section B and the template S ascertained by the dynamic time warping is larger than a predefined adaptation threshold value. In other words, the adaptation criterion is met when although a section B is assigned to a cluster C, it is not close to the cluster C barycenter; i.e. the template S. In this case, the differences between the section B and the template S can be regarded as being sufficient enough that an adaptation of the template S; i.e. a recalculation of the cluster C barycenter, leads to a change to be taken into account which can in particular have an effect on future comparisons to other sections B of the sensor data stream.

If the predefined similarity criterion is not met by any of the ascertained similarity measures, a new cluster C can be generated with the further section B as the only member, wherein a corresponding template S is formed by the further section B.

FIG. 4 shows a display illustrating an adaptation of a template S. The time course of a transversal distance dX between two vehicles is therein mapped; i.e. the distance between the vehicles perpendicular to their direction of travel.

The transversal distance dX can be used as a parameter which at least partially characterizes a traffic scenario, particularly a merge-in maneuver. At the beginning of the merge-in maneuver, there are two vehicles in adjacent lanes such that the transversal distance between them amounts for example to approximately 4 m. Toward the end of the maneuver, the two vehicles are in the same lane such that the transversal distance between them essentially amounts to 0 m.

A plurality of sections B of a sensor data stream containing a time curve of sensor data which characterize the transversal distance dX in the respectively same traffic scenario, in this case a merge-in maneuver, are plotted in FIG. 4. Section B is thereby shorter or longer depending on how aggressively the driving maneuver is executed. Irrespective of this, however, the shapes of the time curve are at least similar.

This similarity can be used to assign a known traffic scenario, e.g. the merge-in maneuver, to a section B of the sensor data stream, wherein section B can be mapped onto template S via dynamic time warping in order to ascertain a measure of similarity between a section B and a template S which characterizes the known traffic scenario. This is explained in detail in conjunction with FIGS. 2 and 3.

The template S is thereby preferably ascertained on the basis of a plurality of sections B of the sensor data stream, e.g. which were previously stored in a database. The sections B previously stored in the database which correspond to the known traffic scenario, here the merge-in maneuver, may for example have been recorded during test drives and accordingly, e.g. manually, selected from the sensor data stream. Alternatively, the sections B can also be sections extracted in situ from the sensor data stream and stored in the database.

In order to ascertain the template S from these sections B, particularly a plurality of sections B of the sensor data stream can be averaged. In order to thereby take the different temporal lengths of the sections B into account, the averaging is preferably realized on the basis of dynamic time warping. In particular, a dynamic time warping barycenter averaging method is preferentially used as described for example in Petitjean et. al. in "A global averaging method for dynamic time warping, with applications to clustering," Pattern recognition, 44(3), 678-693 (2011).

The averaging of the sections B of the sensor data stream shown in FIG. 4 thusly effected results in the template S likewise shown in FIG. 4, which is generic with respect to the traffic scenario it characterizes, in the present case the merge-in maneuver.

LIST OF REFERENCE NUMERALS 1 device for analyzing a sensor data stream
2 processing module
3 assignment module
4 database
5 sensor device
6 driver assistance system
6 data processing unit
100 method for analyzing a sensor data stream
S1-S9 method steps
A output signal B sensor data stream section
C cluster
D sensor data stream
C template
dX transversal distance
$dX_{start}$ transversal start distance
$dX_{end}$ transversal end distance

What is claimed is:

1. A computer-implemented method for analyzing a sensor data stream of a sensor device of a vehicle or a simulation characterizing a vehicle environment with respect to a presence of traffic scenarios which comprises:
    ascertaining a similarity measure that indicates a degree of correspondence between a section of the sensor data stream and at least one template stored in a database of a computer by mapping the section of the sensor data stream onto the at least one template by means of dynamic time warping, wherein the at least one template characterizes a known traffic scenario, and wherein the similarity measure is formed by a distance between the section of the sensor data stream and the at least one template;
    assigning the known traffic scenario to the section of the sensor data stream when the similarity measure satisfies a predefined similarity criterion; and
    adapting the at least one template when the similarity measure simultaneously satisfies the predefined similarity criterion and a predefined adaptation criterion.

2. The method according to claim 1, wherein the section of the sensor data stream is stored in the database upon being assigned to the known traffic scenario.

3. The method according to claim 2, further comprising:
    saving the section of the sensor data stream in the database as a further template when the similarity measure does not satisfy the predefined similarity criterion.

4. The method according to claim 1, further comprising:
    checking whether the at least one template is stored in the database; and
    adding the section of the sensor data stream to the database as the at least one template as a function of a test result.

5. The method according to claim 1, wherein all sections of the sensor data stream assigned to the known traffic scenario are averaged by dynamic time warping when adapting the at least one template.

6. The method according to claim 1, wherein the predefined similarity criterion is satisfied when the similarity measure falls below a predefined similarity threshold value.

7. The method according to claim 1, wherein the predefined adaptation criterion is satisfied when the similarity measure exceeds an adaptation threshold value which is dependent on the predefined similarity criterion.

8. The method according to claim 1, further comprising:
    predefining the similarity criterion on the basis of a comparison of multiple similarity measures ascertained in the mapping of at least the section of the sensor data stream assigned to the known traffic scenario to one another.

9. The method according to claim 1, wherein a plurality of similarity measures is ascertained by mapping the section of the sensor data stream onto a respective one of a plurality of templates stored in the database, each of which characterizes a different known traffic scenario, and the section of the sensor data stream is assigned to the known traffic scenario based on a comparison of the plurality of ascertained similarity measures to one another.

10. The method according to claim 1, wherein the sensor data stream characterizes at least one distance between two road users in the known traffic scenario.

11. The method according to claim 1, wherein the sensor data stream is provided by the sensor device of the vehicle while the vehicle is in operation.

12. The method according to claim 1, further comprising:
    selecting the section from the sensor data stream, wherein a start of the section of the sensor data stream or an end of the section of the sensor data stream is selected such that the start of the section of the sensor data stream and the end of the section of the sensor data stream are separated from one another by a predefined period of time.

13. The method according to claim 12, wherein at least the selecting of the section of the sensor data stream, the ascertaining of the similarity measure, and the assigning of the section of the sensor data stream are performed repeatedly, and during the repeated selecting of the section of the sensor data stream, the start or the end of the section of the sensor data stream is thereby selected such that the section of the sensor data stream overlaps a previously selected section of the sensor data stream by no more than halfway.

14. A method for guiding a vehicle on the basis of a sensor data stream via a driver assistance system, wherein the sensor data stream is analyzed by the method according to claim 1.

15. A device for analyzing a sensor data stream of a sensor device of a vehicle or a simulation characterizing a vehicle environment with respect to a presence of traffic scenarios, which comprises:
    a processing module configured to ascertain a similarity measure indicating a degree of correspondence between a section of the sensor data stream and at least one template stored in a database of the device by mapping the section of the sensor data stream onto the at least one template wherein the template characterizes a known traffic scenario; and
    an assignment module configured to assign the known traffic scenario to the section of the sensor data stream when the similarity measure meets a predefined similarity criterion, wherein the at least one template is adapted when the similarity measure simultaneously satisfies the predefined similarity criterion and a predefined adaption criterion.

16. The device of claim 15, wherein the processing module is able to be executed by a processor.

17. The device of claim 15, wherein the assignment module is able to be executed by a processor.

* * * * *